(12) United States Patent
Hansen et al.

(10) Patent No.: US 6,584,189 B1
(45) Date of Patent: Jun. 24, 2003

(54) CALL ROUTING DATA MANAGEMENT

(75) Inventors: Mikael Højer Hansen, Copenhagen (DK); Rene Petersen, Valby (DK); Kim Mahler, Birkerød (DK); Hans Grønnebæk Hansen, Copenhagen (DK); Marianne Horstmann, Værlose (DK); Svend Erik Krum-Møller, Roskilde (DK)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/221,164

(22) Filed: Dec. 28, 1998

(30) Foreign Application Priority Data

Jul. 1, 1998 (GB) ............................................. 9814311

(51) Int. Cl.$^7$ ............................................... H04M 7/00
(52) U.S. Cl. ............................. 379/221.02; 379/220.01
(58) Field of Search ................................. 379/219–225

(56) References Cited

U.S. PATENT DOCUMENTS

| | | | | |
|---|---|---|---|---|
| 4,797,915 A | * | 1/1989 | Bowker et al. ............. | 379/216 |
| 5,038,340 A | | 8/1991 | Ochiai | |
| 5,072,379 A | | 12/1991 | Eberhardt | |
| 5,289,536 A | | 2/1994 | Hokari | |
| 5,311,585 A | * | 5/1994 | Armstrong et al. ......... | 379/221 |
| 5,317,566 A | | 5/1994 | Joshi | |
| 5,351,237 A | | 9/1994 | Shinohara et al. | |
| 5,404,451 A | | 4/1995 | Nemirovsky et al. | |
| 5,425,085 A | | 6/1995 | Weinerger et al. | |
| 5,491,690 A | | 2/1996 | Alfonsi et al. | |
| 5,508,999 A | | 4/1996 | Cox, Jr. et al. | |
| 5,515,425 A | * | 5/1996 | Penzias et al. ............... | 379/114 |
| 5,570,417 A | | 10/1996 | Byers | |
| 5,583,862 A | | 12/1996 | Callon | |
| 5,606,602 A | * | 2/1997 | Johnson et al. ............. | 379/115 |
| 5,615,254 A | * | 3/1997 | Qiu et al. ............... | 379/221.01 |
| 5,638,433 A | | 6/1997 | Bubien, Jr. et al. | |
| 5,768,360 A | * | 6/1998 | Reynolds et al. ....... | 379/114.02 |
| 5,790,642 A | * | 8/1998 | Taylor et al. .......... | 379/114.01 |
| 5,881,138 A | * | 3/1999 | Kearns et al. ............... | 379/114 |
| 5,903,638 A | * | 5/1999 | Welter et al. .......... | 379/112.04 |
| 5,917,897 A | * | 6/1999 | Johnson et al. ............. | 379/114 |
| 6,021,191 A | * | 2/2000 | Ash et al. .................... | 379/221 |
| 6,091,720 A | * | 7/2000 | Bedard et al. ............... | 370/238 |
| 6,178,235 B1 | * | 1/2001 | Petersen et al. ............. | 379/134 |
| 6,208,719 B1 | * | 3/2001 | Lo et al. ..................... | 379/112 |

FOREIGN PATENT DOCUMENTS

| | | |
|---|---|---|
| EP | 0 537 408 A1 | 4/1993 |
| EP | 0 608 066 A2 | 7/1994 |
| EP | 0 616 477 A1 | 9/1994 |
| GB | 2 300 089 A | 10/1996 |
| WO | WO 97/39592 | 10/1997 |
| WO | WO 98/04088 | 1/1998 |

* cited by examiner

*Primary Examiner*—Ahmad F. Matar
*Assistant Examiner*—Hector Agdeppa

(57) ABSTRACT

The invention relates to a switched network for use in a telecommunications network comprising a plurality of networks. The switched network has at least one switch for routing traffic to a required destination via another network according to a routing table. The switched network has call routing data management means including: means for monitoring a plurality of parameters associated with the other networks in the telecommunications network; means for determining a routing table for each switch in said network based on the monitored parameters; and, means for controlling the switch or switches according to the determined routing table.

15 Claims, 4 Drawing Sheets

CALL ROUTING DATA MANAGEMENT

FIELD OF THE INVENTION

The invention relates to the routing of traffic in a telephone network, and in particular to the management of switching network systems for telephony and data transmission. It is equally applicable to fixed networks and mobile networks.

BACKGROUND

The invention is concerned with routing traffic through a network where a network operator has the choice between more than one carrier.

When a subscriber makes a call, the subscriber uses one operator, but the operator is free to route the call through other carriers' networks. The operator will choose which other carrier to use based on the tariff charges, amount of traffic, time of day, destination, and so on.

This is particularly true in the case of international traffic where many operators are forced to make use of other carriers. These operators might not even own a network but lease part of another operator's network. This function is known as International Simple Resale (ISR).

As the number of these operators has grown dramatically, the need to support day-to-day processes, by providing fast accurate information that helps them make quality decisions, has become relevant.

Operators currently providing this service manage their networks manually. They calculate the optimal routing tables for their exchanges and input the data by use of man machine language (MML). Due to the interconnect agreements between the operators it is often profitable to change the routing tables often, e.g. several times a day, and the changes have to be applied to each switching exchange on location.

Calculating the optimal traffic routes and applying the changes to the network therefore requires a large amount of resource. This is due to the complexity of the calculations, the amount of calculations and the fact that they have to input the new data on location. The calculations are complex because many dynamic parameters are involved. When manual processes are used, the number of dynamic parameters used is reduced, thereby simplifying the complexity of the calculation. This situation increases the risk for making mistakes.

Another problem is that when managing the routing tables manually, it is difficult to separate the destinations into small areas. For this reason, a whole country is usually defined as one area, and subscribers are charged the same amount of money no matter where in the country the call is destined. Operators might therefore prefer to divide their business area into smaller areas and charge subscribers in a more refined way, but then it becomes too demanding to solve manually.

The aim of the present invention is to provide a call routing management system which overcomes the disadvantages mentioned above.

SUMMARY OF THE INVENTION

According to a first aspect of the invention, there is provided a switched network for use in a telecommunications network comprising a plurality of networks, and in which said switched network has at least one switch for routing traffic to a required destination via another network according to a routing table, wherein said routing network has call routing data management means including: means for monitoring a plurality of parameters associated with the other networks in the telecommunications network; means for determining a routing table for each switch in said network based on the monitored parameters; and, means for controlling the switch or switches according to the determined routing table.

According to a second aspect of the invention, there is provided a method of routing calls in a switched network for use in a telecommunications network comprising a plurality of networks, in which said switched network has at least one switch for routing traffic to a required destination via another network according to a routing table, the method comprising the steps of: monitoring a plurality of parameters associated with the other networks in the telecommunications network; determining a routing table for each switch in said routing network based on the monitored parameters; and, controlling the switch or switches according to the determined routing table.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF A PREFERRED EMBODIMENT OF THE PRESENT INVENTION.

Figure 1:
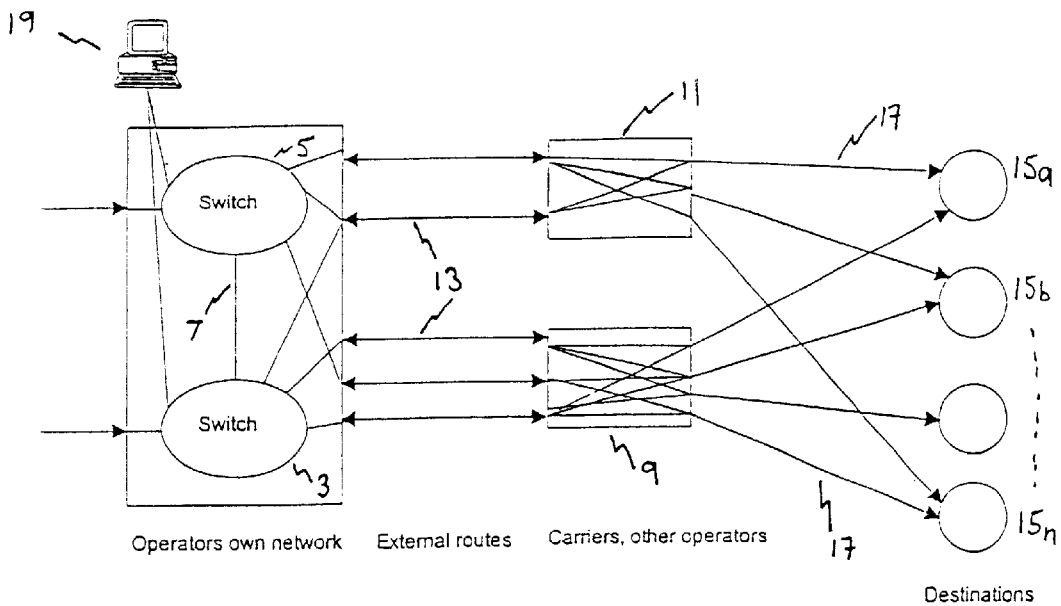
FIG. 1 shows a simplified diagram of a typical network configuration.

FIG. 1 shows a simplified network. It comprises an operator's network 1 containing switches 3 and 5. Within the operator's network, the switches are connected by tie routes 7. Although only two switches and one tie route are shown, the operator's network can comprise any number of switches, and can be configured using various tie arrangements. The operator's network is connected to other carriers or network operators 9 and 11 by external routes 13. Each carrier or operator 9/11 may have switches of its own, and connects to various destinations $15_a$ to $15_n$ via Remote Virtual Paths (RVPs) 17. The switches 3 and 5 route calls according to their individual routing tables. These routing tables are updated from a central call routing data management unit 19, as will be described later.

Each carrier or network operator 9/11 will have its own pricing structure for the destinations it supports, which can vary by time-of-day and day-of-week. Each carrier will also provide different quality of service levels to different destinations.

Figure 2:
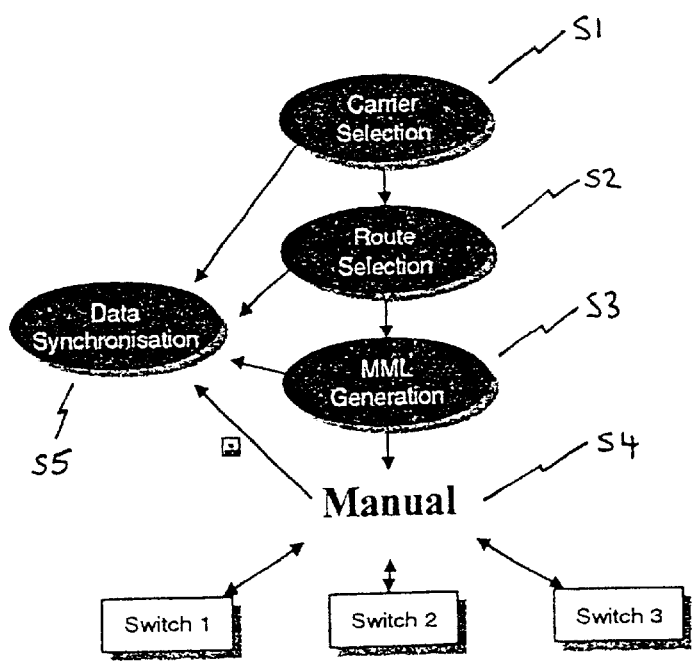
FIG. 2 shows a call routing system according to the first embodiment of the present invention.

FIG. 2 shows a functional overview of the operation of the invention according to a first embodiment. In the call routing data management unit 19, the optimal carrier selection for each destination is determined in step S1 based on the environmental parameters that prevail at a particular time, e.g. carrier cost, carrier quality, time of day, amount of traffic, foreign currencies, and so on. A route is then selected in step S2, to pass traffic to the selected carriers from each switch. In step S3, the call routing data management unit 19 creates a generic route case description for each destination on each switch. According to the operation of this first embodiment, a network manager, (being a person responsible for the operator's network), can then use the generic routing case description as work orders for implementing a routing case on a switch which is not supported by the system. The network manager is also able to manually schedule and download the routing case files to each switch in the operator's network, as shown in step S4. The system also has the capability of comparing the actual switch configuration with data in the call routing data management unit 19, as shown in step S5, and identifying any discrepancies between the two.

Each of the elements making up the above embodiment are carried out in the central call routing data management unit 19 (as shown in FIG. 1). A more detailed description of the processes involved in each of these elements is given below.

Figure 3:
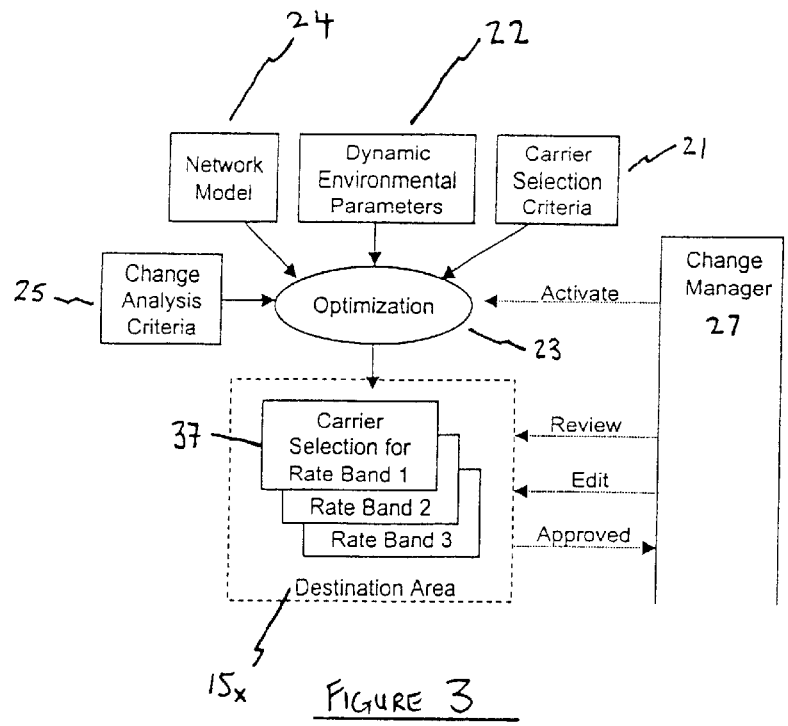
FIG. 3 shows in greater detail the carrier selection process of FIG. 2.

FIG. 3 expands on the carrier selection process of FIG. 2. "Carrier selection" lists in a defined order the carriers that are to be used to carry traffic to a specific destination area during a specific period of a defined day. The purpose of the carrier selection process is to determine whether there has been a change to one or more of the parameters being monitored by the Dynamic Environmental Parameters unit 22 (eg. Interconnect charges, quality status, carries class, etc). If any of these have changed, the carrier selection process determines whether the carrier selection should be changed for a specific destination. According to the first embodiment, the network manager is able to evaluate the impact of the change before approving a new carrier selection.

The configuration of the telecommunications network is defined in a network model 24. This specifies how the constituent elements (ie. switches, carriers, other networks, etc) are all arranged. The call routing data management unit 19 provides the network manager with a list of all carriers that are connected via a Remote Virtual Path (RVP) to each destination area. The list is subdivided into various rate bands, and sorted by the interconnection charge recorded for each carrier. The list is known as the "Carrier List".

For each carrier listed, the system provides the following information:

The Carrier Class as defined by the network manager.

The active status of the carrier or the Remote Virtual Path. If either one or both of these network objects is marked "Offline" then the status shows "Offline"

The quality status of the external route or the Remote Virtual Path. The system displays the lowest ranked status associated with both of these network objects.

The Loop-back Risk Status—the system determines whether there is a risk of loop-back for this carrier due to the existence of a reciprocal agreement to pass traffic to the specific destination area.

The total capacity of all external routes to the carrier.

The average occupancy of all external routes to the carrier.

The forecast estimate of the occupancy of all external routes if the carrier was selected as the primary choice carrier in the carrier selection.

A list of the operator switches that are directly connected via an external route to the carrier.

In FIG. 3, the "carrier selection criteria" process 21 is used to generate and recommend to the network manager a carrier selection. The selection is determined by applying a defined set of criteria to the carrier list. The system supports a default carrier selection criteria, but, if desired, the network manager can also define a carrier selection criteria for a specific destination area.

For example, the network manager can define the following information for each level in the carrier selection criteria:

An acceptable level of carrier class e.g. minimum of "High".

An acceptable level of quality as defined by the quality status measure e.g. greater than "Poor".

An acceptable level of total route occupancy e.g. less than 70% utilised.

The valid set of switch combinations e.g. the 2nd choice Carrier must be on the same switch as the 1st choice Carrier.

The system has implicit criteria to determine whether the carrier selection has changed as a result of the optimisation process 23 (see below). This is carried out in the change analysis criteria 25.

The network manager can activate the optimisation process 23 at any time. This process performs the following tasks:

Creates an updated Carrier List

Creates a recommended Carrier Selection based on the Carrier Selection Criteria 21.

Determines whether the Carrier Selection has changed since it was last evaluated by applying the Change Analysis Criteria 25.

Updates the Change Manager 27 accordingly.

The order in which the system performs this process is prioritised so that it will firstly optimise the routes to destinations that are likely to receive the most traffic, and which are likely to provide the highest profit margin.

Using the above, the network manager is able to define the Carrier Selection that he intends to implement on all the operator's switches. The network manager is able to use the Carrier Selection recommended by the call routing data management unit 19, or create a new Carrier Selection. Whichever option is chosen, the result is a Carrier Selection 37 for each destination $15_x$.

Figure 4:
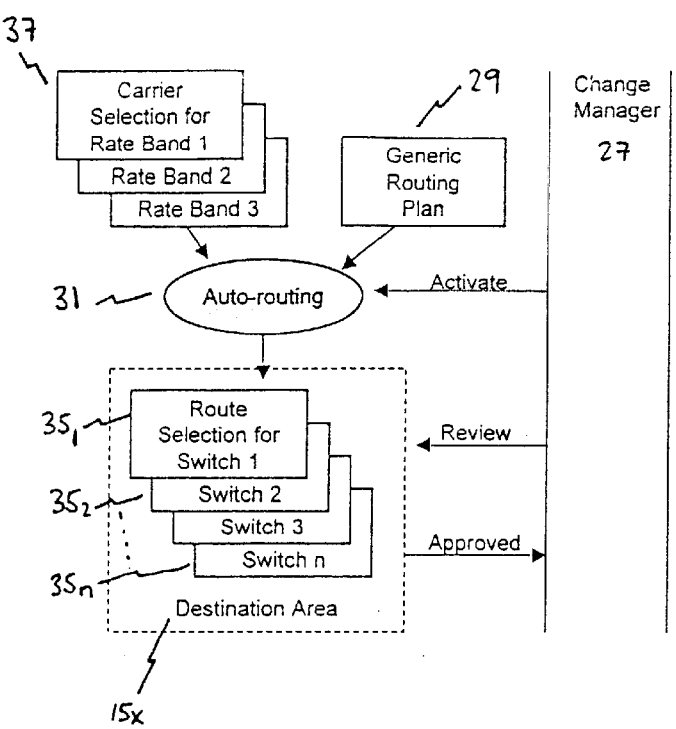
FIG. 4 shows in greater detail the route selection process of FIG. 2.

FIG. 4 shows in greater detail the Route Selection Process of FIG. 2. The purpose of the route selection process is to convert the approved carrier selection for a destination area $15_x$ into a definition of the tie and external routes to be used to physically carry the traffic from each operator switch to each carrier selected. A generic routing plan 29 allows the network manager to define the route alternatives (a list of tie and external routes in order of preference) to be used to carry traffic from a specific operator switch to a specific carrier.

For each combination of operator switch and carrier, the network manager can define different route alternatives for the following:

Destination area—This allows the network manager to specify different route alternatives to one or a group of destination areas. For example, the operator may wish to define one set of route alternatives for Europe and another for the rest of the world.

Route Origin—This allows the network manager to specify different route alternatives depending on one or more incoming routes to an operator switch. This allows the operator to differentiate the routing depending on the source of the traffic.

Random Selection (load sharing)—This allows the network manager to specify different route alternatives for defined percentages of the total traffic volume to a specific destination area. For example, if an operator had two routes to the same carrier, then the network manager could define one route as the primary choice and the other as the secondary choice for 60% of the traffic, and reverse the order for the other 40%.

Auto-routing Process 31—The network manager can activate the Auto-routing Process 31 at any time for a specific destination area or apply it to all destination areas using a specific approved carrier selection 37 which is awaiting processing.

For each destination area $15_x$ affected, this process will raise the relevant route alternatives for each carrier in the carrier selection as stated in the Generic Routing Plan 29, and place them in the correct order into the route selection. At the end of the process there will exist a route selection $35_1 \ldots 35_n$ for each of the n operator switches for each of the destination areas analyzed.

The network manager can view each route selection $35_1 \ldots 35_n$ and recommend it for submission to the Man Machine Language (MML) Generation Process via the change manager 27.

If desired, the system can be set-up to allow a different network manager to approve each new Route Selection.

Figure 5:
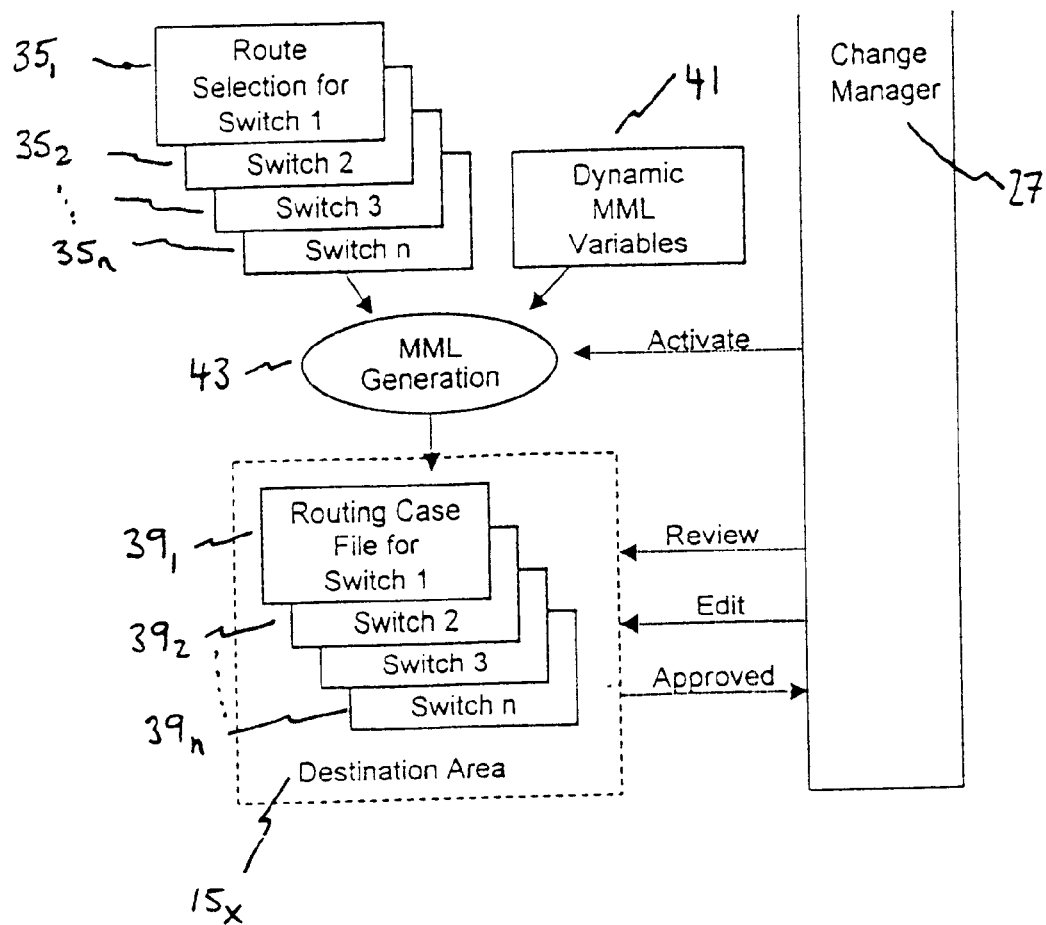
FIG. 5 shows in greater detail the Man Machine Language (MML) generation process of FIG. 2.

FIG. 5 shows in greater detail the Man Machine Language MML Generation Process of FIG. 2. The purpose of the MML Generation Process 43 is to create a generic routing case description to be used as work orders. These are created from the approved route selections $35_1 \ldots 35_n$, in the form of a routing case file $39_1 \ldots 39_n$ for each switch. The dynamic MML variables 41 include routing case number, routing case parameters and route parameters. For the routing case number, the network manager can specify a default routing case reference number for each destination area or, if preferred, define a specific reference number for each operator switch and destination area combination. If the default is maintained then the system will generate routing case files with the same reference number to the same destination area for each operator switch.

For each route alternative the system can add a range of route parameters. For example:

Sending Program

B-Number Type

Echo Selection

The network manager can define a default value for each of these parameters and also an alternative value for specific cases.

The network manager can activate the MML Generation Process 43 at any time for a specific destination or apply it to all destination areas with an approved route selection awaiting processing. As mentioned above, the inputs to this process are the route selections $35_1 \ldots 35_n$. The process 43 then generates generic routing case description, in the form of routing case files $39_1 \ldots 39_n$, for each associated switch. A generic routing case description means that the Man Machine Language may not contain all the MML elements required by the operator's switches. Consequently, the routing case descriptions should be reviewed and, if necessary, edited by the network manager prior to being downloaded onto the operator's switches.

The network manager can view and edit each routing case file as required via the Change Manager 27.

Therefore, in response to one of the monitored parameters changing, the embodiment described above firstly selects the appropriate carrier for each destination, and then determines the routing table that will allow traffic to pass from each switch to the chosen carrier. Generic routing case descriptions for realising the routing paths are then generated, checked by a network manager, and then downloaded onto each respective switch.

Figure 6:
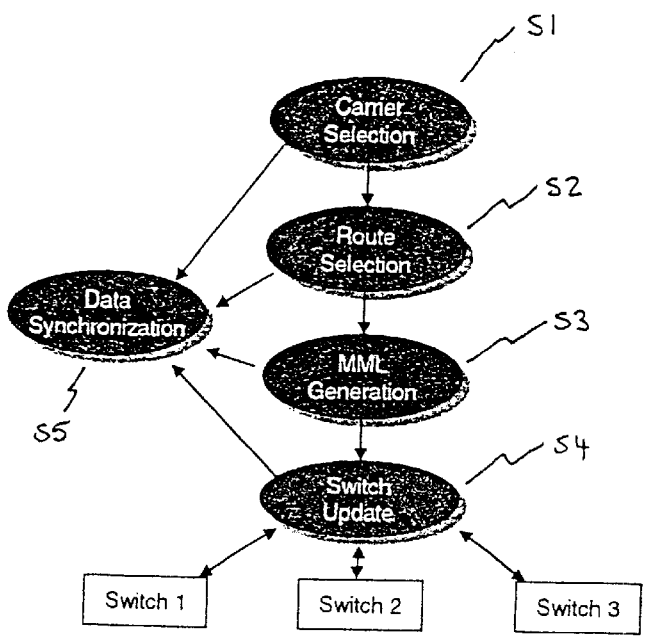
FIG. 6 shows a call routing system according to a second embodiment of the present invention.

A functional overview of the operation of the invention according to a second embodiment is shown in FIG. 6. Steps one and two are identical to those in the first embodiment described above. The parameters relating to each carrier or network operator are continually monitored. Based on these monitored parameters, the optimal carrier selection for each destination is determined in step S1 based on the environmental factors that prevail at a particular time. A route is then selected in step S2, to pass traffic to the selected carriers from each switch. According to the second embodiment, however, the system automatically generates in step S3 the switch MML in the form of a routing case file for each destination on each switch. In addition, the scheduling and downloading of the routing tables is automatically controlled to each switch in the operator's network, step S4. This updating of the switches may also handle all login security issues, that is, preventing unauthorised changes to the switch routing. The system also has the capability of comparing the actual switch configuration with data in the management system, as shown in step S5, and identifying any discrepancies.

Figure 7:
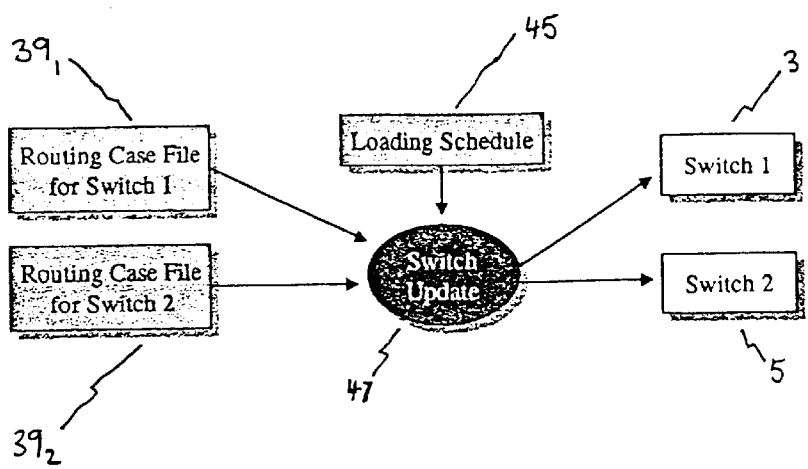
FIG. 7 shows in more detail the steps involved in updating the switch routing tables in FIG. 6.

FIG. 7 shows in greater detail the steps involved in automatically downloading the routing case files to the operators's switches. Having produced the routing case files from the steps discussed above, the central call routing management unit then determines a network loading schedule 45 which identifies the sequence in which routing case files should be downloaded to the switches. The switches 3 and 5 are then updated 47 by downloading the associated routing case files for each switch into the network. The sequence is important and ensures that the routing case for a specific destination is made operative at the furthest point in the operator's network first (or at least at the same time as all other switches). Once the routing case has been downloaded, the central call routing management unit 19 may interpret the responses provided by the switch to ensure the process was successful. Once confirmed, the central call routing management unit can then update its database with the new operative carrier selection.

The invention as described in the embodiments above enables operators to optimise their routing tables. Furthermore, management of the routing tables is much more efficient since they are handled centrally, and the operators are able to optimise their routing tables at any given time.

The dynamic nature of the invention means that upon an event occurring in an operational environment (eg. a carrier provider reducing a tariff, or the quality of a carrier changes), the central call routing data management unit provides a mechanism for quickly assessing the impact of the change and if necessary, rapidly reconfiguring the network to accommodate the change.

On-line receival of routing optimisation data means that the system can respond faster to changes in operating parameters. It also allows a greater number of destinations to be used, for example, by dividing destination areas into towns rather than countries.

What is claimed is:

1. A switched telecommunications network connected to a plurality of carrier networks, said switched network having at least one switch for routing a call to a desired destination via a selected carrier network according to a routing table in each switch, wherein said switched network has call routing data management means comprising:

means in the switched network for monitoring a plurality of operational performance parameters for each of the carrier networks;

means in the switched network for automatically determining a routing table for each switch in the switched network based, at least in part, on the monitored operational performance parameters of the carrier networks;

means in the switched network for determining that a monitored operational performance parameter for one of the carrier networks has changed;

means in the switched network for automatically updating the routing table in each switch upon determining that a monitored operational performance parameter for one of the carder networks has changed; and means for selecting a carrier network and controlling each switch according to each switch's determined routing table to route the call to the selected carrier network based, at least in part, on the monitored operational performance parameters of the carrier networks.

2. The switched network as claimed in claim 1, wherein the means in the switched network for monitoring a plurality of operational performance parameters for each of the carrier networks includes means for also monitoring cost parameters associated with the carrier networks.

3. The switched network as claimed in claim 1, wherein the operational performance parameters include quality of service (QoS) parameters.

4. The switched network as claimed in claim 2, wherein the means for automatically determining a routing table for each switch comprises:

means for automatically selecting from the carder networks being monitored, an optimal carrier for each destination based on the operational performance parameters and cost parameters being monitored; and means for automatically determining which mute to use to pass traffic from each switch to the selected carrier.

5. The switched network as claimed in claim 2, wherein the operational performance parameters and cost parameters are monitored online.

6. The switched network as claimed in claim 4, further comprising a network manager that defines a set of carrier-selection criteria, and wherein the means for automatically selecting an optimal carrier utilizes the defined set of carrier-selection criteria to select the optimal carrier.

7. The switched network as claimed in claim 2, further comprising means for creating a generic routing case description for each destination to assist in determining the routing table for each switch.

8. The switched network as claimed in claim 6, wherein the defined set of carrier-selection criteria is applied to each monitored carrier, and is selected from a group consisting of:

carrier class;

quality of service guaranteed;

measured level of total route occupancy before being selected;

expected level of total route occupancy after being selected;

interconnect charges; and availability of a valid set of switch combinations.

9. A method of routing calls in a switched telecommunications network connected to a plurality of carrier networks, wherein said switched network includes at least one switch for routing a call to a desired destination via a selected carrier network according to a routing table in each switch, the method comprising the steps of:

monitoring by a network manager in the switched network, a plurality of operational performance parameters for each of the carrier networks;

automatically determining by the network manager, a routing table for each switch in the switched network based, at least in part, on the monitored operational performance parameters of the carrier networks;

determining by the call routing data manager, that a monitored operational performance parameter for one of the carrier networks has changed;

automatically updating by the call routing data manager, the routing table in each respective switch in accordance with a loading schedule; and controlling each switch according to each switch's determined routing table to route the call to a selected carrier network based, at least in part, on the monitored operational performance parameters of the carrier networks.

10. The method as claimed in claim 9, wherein the step of monitoring a plurality of operational performance parameters for each of the carrier networks also includes monitoring cost parameters associated with the carrier networks.

11. The method as claimed in claim 10, wherein the step of automatically determining the routing table includes:

automatically selecting from the carrier networks being monitored, an optimal carrier for each destination based on the operational performance parameters and cost parameters being monitored; and automatically determining which route to use to pass traffic from each switch to the selected carrier.

12. The method as claimed in claim 10, wherein the step of monitoring the operational performance parameters and cost parameters includes monitoring the parameters online.

13. The method as claimed in claim 11, wherein the steps of automatically updating the routing table in each switch and automatically selecting an optimal carrier are triggered in response to one of the monitored operational performance parameters and cost parameters changing.

14. The method as claimed in claim 11, wherein the step of automatically selecting an optimal carrier includes utilizing a set of carrier-selection criteria defined by the network manager to select the optimal carrier.

15. The method as claimed in claim 11, further comprising the step of creating by a call routing data management unit, a generic routing case description for each destination to assist the network manager in creating a routing table for each switch.

* * * * *